(12) United States Patent
Tong (10) Patent No.: US 10,131,546 B2
(45) Date of Patent: Nov. 20, 2018

(54) APPARATUS AND METHOD FOR PRODUCING MAGNESIUM SULFATE FROM COAL-FIRED BOILER FLUE GAS

(71) Applicant: Shanghui Tong, Beijing (CN)

(72) Inventor: Shanghui Tong, Beijing (CN)

( * ) Notice: Subject to any disclaimer, the term of this patent is extended or adjusted under 35 U.S.C. 154(b) by 5 days.

(21) Appl. No.: 15/371,491

(22) Filed: Dec. 7, 2016

(65) Prior Publication Data

US 2017/0081206 A1    Mar. 23, 2017

Related U.S. Application Data

(63) Continuation of application No. PCT/CN2015/092541, filed on Oct. 22, 2015.

(30) Foreign Application Priority Data

Dec. 3, 2014    (CN) .......................... 2014 1 0718548

(51) Int. Cl.
    *C01F 5/40*      (2006.01)
    *B01D 53/96*     (2006.01)
    (Continued)

(52) U.S. Cl.
    CPC ............ *C01F 5/40* (2013.01); *B01D 53/1418* (2013.01); *B01D 53/1425* (2013.01);
    (Continued)

(58) Field of Classification Search
    CPC ........ B01D 2257/302; B01D 2251/402; B01D 2251/602; B01D 2251/102;
    (Continued)

(56) References Cited

FOREIGN PATENT DOCUMENTS

| CN | 1481926 A | * | 3/2004 |
|----|-----------|---|--------|
| CN | 1481926 A |   | 3/2004 |

(Continued)

OTHER PUBLICATIONS

International Search Report from corresponding International Patent Application No. PCT/CN2015/092541, dated Jan. 20, 2016.

(Continued)

*Primary Examiner* — Amber R Orlando
*Assistant Examiner* — Syed T Iqbal
(74) *Attorney, Agent, or Firm* — Tucker Ellis LLP (57) ABSTRACT

The present invention provides an apparatus and a method for producing magnesium sulfate through flue gas desulfurization, and specifically provides an apparatus and a method suitable for producing magnesium sulfate through direct crystallization in a magnesium oxide based desulfurization waste liquid tower of flue gas with a small content of oxygen like a coal fired boiler flue gas. The apparatus includes an oxygenation equipment, a flue gas desulfurization equipment, a seriflux cycling equipment, an evaporation and concentration equipment, a cycling and precipitating equipment, an oxidation equipment, a crystallization equipment, a centrifugation equipment and a drying equipment, etc. The apparatus and method of the present invention can greatly reduce electric power consumption of oxidation fans and steam consumption, as well as guarantee desulfurization efficiency and quality of a magnesium sulfate by-product, reduce lots of operation costs of the magnesium sulfate production system, and reduce desulfurization operation costs.

10 Claims, 1 Drawing Sheet

(51) Int. Cl.
   *B01D 53/14* (2006.01)
   *B01D 53/50* (2006.01)
   *C01F 5/42* (2006.01)
(52) U.S. Cl.
   CPC ..... *B01D 53/1431* (2013.01); *B01D 53/1481* (2013.01); *B01D 53/1493* (2013.01); *B01D 53/504* (2013.01); *B01D 53/96* (2013.01); *C01F 5/42* (2013.01); *B01D 2251/102* (2013.01); *B01D 2251/402* (2013.01); *B01D 2251/602* (2013.01); *B01D 2252/10* (2013.01); *B01D 2257/302* (2013.01); *B01D 2258/0283* (2013.01); *C01P 2004/60* (2013.01); *Y02P 20/133* (2015.11)
(58) Field of Classification Search
   CPC ........ B01D 2258/0283; B01D 53/1418; B01D 53/1481; B01D 2252/10; B01D 53/1425; B01D 53/1431; B01D 53/504; B01D 53/1493; B01D 53/96; C01P 2004/60; C01F 5/42; C01F 5/40; Y02P 20/133
   See application file for complete search history.

(56) References Cited

FOREIGN PATENT DOCUMENTS

| | | |
|---|---|---|
| CN | 1544331 A | 11/2004 |
| CN | 1775681 A | 5/2006 |
| CN | 201235279 Y | 5/2009 |
| CN | 101947406 A | 1/2011 |
| CN | 102745725 A | 10/2012 |
| CN | 102745726 A | 10/2012 |
| CN | 102806004 A | 12/2012 |
| CN | 102836636 A | 12/2012 |
| CN | 103588230 A * | 2/2014 |
| CN | 103588230 A | 2/2014 |
| CN | 104477952 A | 4/2015 |
| PL | 179681 B1 | 10/2000 |

OTHER PUBLICATIONS

Chinese Office Action from the corresponding Chinese Application No. 201410718548X, dated Dec. 3, 2015.

\* cited by examiner

APPARATUS AND METHOD FOR PRODUCING MAGNESIUM SULFATE FROM COAL-FIRED BOILER FLUE GAS

CROSS-REFERENCE TO RELATED APPLICATIONS

The present application is a continuation of International Patent Application No. PCT/CN2015/092541, filed on Oct. 22, 2015, which claims priority to Chinese patent application No. 201410718548.X, filed on Dec. 3, 2014, the contents of both of which are incorporated herein by reference in their entireties.

TECHNICAL FIELD

The present invention relates to an apparatus and a method for producing magnesium sulfate through flue gas desulfurization and, particularly relates to an apparatus and a method for producing magnesium sulfate through direct crystallization in a magnesium oxide based desulfurization waste liquid tower. The apparatus and method of the present invention are especially suitable for producing magnesium sulfate through waste seriflux of coal fired boiler flue gas desulfurization.

BACKGROUND

The magnesium oxide based flue gas desulfurization techniques have been gradually promoted and applied in the market of the coal fired boiler flue gas treatment, the market share of which accounts for less than 1% in 2005 and at present over 6%, and the wet magnesium oxide based flue gas desulfurization techniques have been recognized by more and more people. The magnesium oxide based desulfurization process is adopted and the desulfurization waste liquid is made into the magnesium sulfite product, which solves the disposal problem of the desulfurized gypsum produced from the traditional calcium based desulfurization, and the magnesium sulfite product can also be processed and made into magnesium sulfate by-product through later aerated oxidation and processing by equipment such as the three-effect evaporator, the sales revenue of the by-product can offset part of operation and maintenance costs of the desulfurization equipment, which has great market application advantage from aspects of both techniques and economics than the traditional calcium based manner.

The techniques of magnesium sulfate production through crystallization of the waste liquid of the traditional magnesium oxide based desulfurization of the coal fired boiler flue gas adopt the oxidation fan as an equipment for necessary oxidation reaction of the transformation from magnesium sulfite to magnesium sulfate, and steam is used as the medium of the evaporation, crystallization and drying, which therefore causes that the manner of producing magnesium sulfate through the desulfurization waste liquid needs a larger consumption of oxidation fans and steam, greatly increasing the operation costs of desulfurization. Moreover, in the process of aerated oxidation with the oxidation fan inside or outside the tower, the transformation and production efficiency from magnesium sulfite to magnesium sulfate is low, and the conversion rate is not high, which in some extent limits the application of the techniques of producing magnesium sulfate through the waste liquid after magnesium based desulfurization in the field of the coal fired boiler flue gas desulfurization. Chinese patent application publication No. CN1775681A provides a manner: blasting air into the tower and aerating the desulfurized seriflux in the tower to transform magnesium sulfite into magnesium sulfate, and then evaporating and concentrating in the three-effect evaporator. This forced aeration and oxidization process needs high-power oxidation fans and a large consumption of electric power.

Still some other processes produce magnesium sulfate or other magnesium compound through a process of forced oxidation, two-effect or three-effect evaporation and crystallization after the desulfurization, e.g. Chinese patent application publication No. CN1544331A provides a manner: forcedly oxidizing the waste liquid after desulfurization, adding a magnesium hydroxide emulsion to neutralize sulfuric acid in the waste liquid, and then generating a magnesium compound through evaporation and crystallization. Such evaporation and crystallization process consumes lots of resources, and the cost is high. The forced oxidation procedure needs to be operated by an aeration system, which cannot guarantee that the effective ingredients in the slurry are conversed to produce a mixed liquid in which the concentration of magnesium sulfate and magnesium sulfite is over 80% under the influence of aeration time, amount of oxygen supplied, temperature and the like. From the point of view of the actual project results at present, most of the projects finally return to disposing the desulfurization by-product through abandonment after operating for a period of time.

SUMMARY

In order to overcome the defects of the prior art, the present invention provides an apparatus and a method for producing magnesium sulfate through flue gas desulfurization and, particularly provides an apparatus and a method for producing magnesium sulfate through direct crystallization in a magnesium oxide based desulfurization waste liquid tower. The apparatus and method of the present invention are especially suitable for producing magnesium sulfate through waste seriflux of coal fired boiler flue gas desulfurization, which can solve the problems such as large electric power consumption of the oxidation fan, lots of steam, high production cost for each ton of mineral and increase in desulfurization operation costs in the present magnesium sulfate production through the magnesium based desulfurization waste liquid.

The present invention provides an apparatus for producing magnesium sulfate through flue gas desulfurization, including:

an oxygenation equipment, configured to increase a content of oxygen in flue gas before the flue gas enters a flue gas desulfurization equipment;

a flue gas desulfurization equipment, an interior of which is provided with a sulfur dioxide absorbing and spraying region, configured to remove sulfur dioxide in the flue gas through magnesium oxide based desulfurization, and form absorption seriflux;

a seriflux cycling equipment, configured to receive the absorption seriflux from the flue gas desulfurization equipment, further oxidize the absorption seriflux into magnesium sulfate seriflux therein, and then cycle the magnesium sulfate seriflux into the sulfur dioxide absorbing and spraying region and an evaporation and concentration equipment;

an oxidation equipment, configured to provide air for the seriflux cycling equipment, so that at least a part of magnesium sulfite in the absorption seriflux is further oxidized into magnesium sulfate;

an evaporation and concentration equipment, configured to evaporate and concentrate the seriflux cycled therein to form a concentration product;

a cycling and precipitating equipment, configured to receive the concentration product from the evaporation and concentration equipment, and precipitate the concentration product, so as to form a precipitation product; and wherein, the seriflux cycling equipment, the evaporation and concentration equipment and the cycling and precipitating equipment are all arranged in the interior of the flue gas desulfurization equipment.

According to the apparatus for producing magnesium sulfate through flue gas desulfurization of the present invention, preferably, the sulfur dioxide absorbing and spraying region includes two or more sulfur dioxide absorbing and spraying layers; the evaporation and concentration equipment is located at a lower portion of the sulfur dioxide absorbing and spraying region.

According to the apparatus for producing magnesium sulfate through flue gas desulfurization of the present invention, preferably, the apparatus further includes a liquid collector, configured to separate the evaporation and concentration equipment and the sulfur dioxide absorbing and spraying region; the oxygenation equipment is arranged at a negative pressure location of a flue.

According to the apparatus for producing magnesium sulfate through flue gas desulfurization of the present invention, preferably, the apparatus further includes:

a crystallization equipment, configured to crystallize the precipitation product from the cycling and precipitating equipment, so as to form a crystallization product;

a centrifugation equipment, configured to centrifugally separate the crystallization product from the crystallization equipment, so as to form a mother liquid and a magnesium sulfate product; and a drying equipment, configured to dry the magnesium sulfate product from the centrifugation equipment.

According to the apparatus for producing magnesium sulfate through flue gas desulfurization of the present invention, preferably, the flue gas satisfies one of following conditions:

1) the flue gas is flue gas that comes from a coal fired boiler;

2) a content of sulfur dioxide in the flue gas is 300 mg/Nm$^3$~20000 mg/Nm$^3$, and a content of oxygen is 0~8 vt %.

The present invention further provides a method for producing magnesium sulfate through the above-mentioned apparatus, including steps of:

an oxygenation step: increasing an content of oxygen in flue gas to 9~18 vt % before the flue gas enters a flue gas desulfurization equipment;

a flue gas desulfurization step: removing sulfur dioxide in the flue gas through magnesium oxide based desulfurization in the flue gas desulfurization equipment, and forming absorption seriflux;

a seriflux cycling step: receiving, by a seriflux cycling equipment, the absorption seriflux from the flue gas desulfurization equipment, further oxidizing the absorption seriflux into magnesium sulfate seriflux therein, and then cycling the magnesium sulfate seriflux into a sulfur dioxide absorbing and spraying region and an evaporation and concentration equipment;

an oxidation step: providing air for the seriflux cycling equipment, so that at least a part of magnesium sulfite in the absorption seriflux is further oxidized into magnesium sulfate;

an evaporation and concentration step: evaporating and concentrating the seriflux cycled therein in the evaporation and concentration equipment, so as to form a concentration product; and a cycling and precipitating step: receiving, by a cycling and precipitating equipment, the concentration product from the evaporation and concentration equipment, and precipitating the concentration product, so as to form a precipitation product.

According to the method of the present invention, preferably, the method further includes:

a crystallization step: crystallizing the precipitation product from the cycling and precipitating equipment, so as to form a crystallization product;

a centrifugation step: centrifugally separating the crystallization product from the crystallization equipment in a centrifugation equipment, so as to form a mother liquid and a magnesium sulfate product; and a drying step: drying the magnesium sulfate product from the centrifugation equipment in a drying equipment.

According to the method of the present invention, preferably, in the oxidation step, a content of magnesium sulfate in the magnesium sulfate seriflux obtained by oxidation is 70~90 wt % of a total content of magnesium sulfite and magnesium sulfate.

According to the method of the present invention, preferably, a seriflux overflowing from the cycling and precipitating equipment in the cycling and precipitating step is filtered and then cycled to the evaporation and concentration equipment; and/or the mother liquid separated in the centrifugation step is cycled into the evaporation and concentration equipment.

According to the method of the present invention, preferably, a magnesium sulfate crystal particle in the precipitation product is larger than 0.1 mm; a magnesium sulfate crystal particle in the crystallization product is larger than 0.15 mm.

The present invention adopts a manner combining glue gas oxygenation, multi-stage absorption, evaporation and concentration, cycle and precipitation, and seriflux oxidation, which greatly reduces the electric power consumption of the oxidation fan and the steam, as well as guarantees the desulfurization efficiency and the quality of the by-product, and reduces lots of operation costs of the by-product production system and the desulfurization operation costs.

BRIEF DESCRIPTION OF DRAWINGS

The FIGURE is a diagram of an apparatus according to an embodiment of the present invention.

Figure 1:
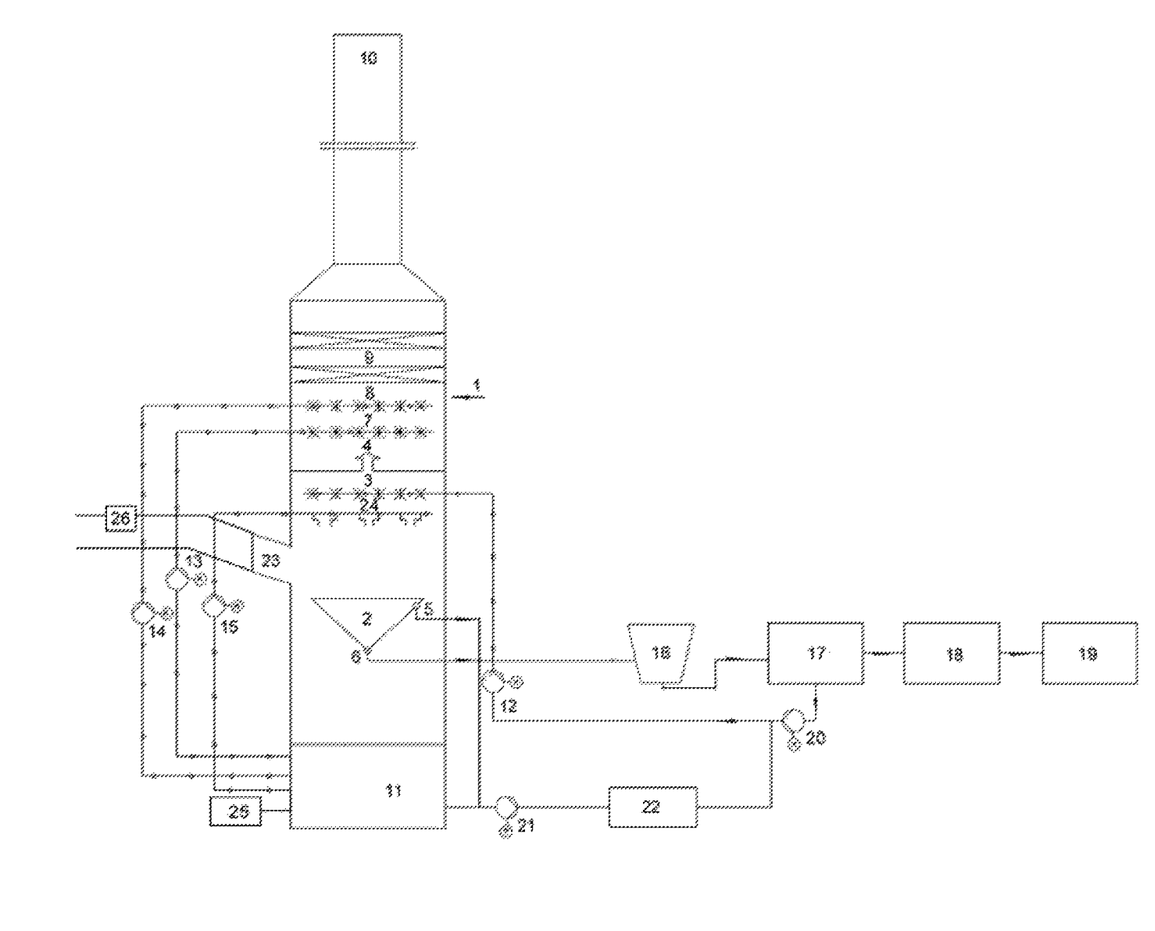

Reference signs: 1—desulfurization tower, 2—cycling and precipitating tank, 3—spraying layer for evaporation and concentration, 4—liquid collector, 5—overflowing opening, 6—discharge outlet of cycling and precipitating tank, 7—two-stage sulfur dioxide absorbing and spraying layer, 8—three-stage sulfur dioxide absorbing and spraying layer, 9—demister, 10—flue gas outlet, 11—seriflux cycling tank, 12—cycling pump for evaporation and concentration, 13—cycling pump of two-stage sulfur dioxide absorbing and spraying layer, 14—cycling pump of three-stage sulfur dioxide absorbing and spraying layer, 15—cycling pump of over-temperature emergency cooling device, 16—crystallization tank, 17—centrifuge, 18—dryer, 19—packaging machine, 20—cycling pump for bringing mother liquid back to spraying layer for evaporation and concentration, 21—discharging pump of seriflux tank, 22—filter, 23—flue gas inlet, 24—over-temperature emergency cooling device, 25—oxidation fan, 26—oxygenation device.

DESCRIPTION OF EMBODIMENTS

The "%" described in the present invention, unless otherwise specified, all refers to volume percentage. The "vt %" described in the present invention refers to volume percentage. The "apparatus" described in the present invention is a product, that is, a system collection of a variety of apparatuses. In the present invention, the outlet and the inlet have a same meaning, and the two can replace each other.

According to an embodiment of the present invention, the flue gas of the present invention can be flue gas coming from a coal fired boiler, in which the content of oxygen is low, therefore the present invention uses an oxygenation equipment to increase the content of oxygen therein, so as to improve the ratio of magnesium sulfate in the absorption seriflux. According to another embodiment of the present invention, the flue gas can be any flue gas with a content of sulfur dioxide at between 300 mg/Nm$^3$~20000 mg/Nm$^3$ and an content of oxygen at between 0~8 vt %. The content of sulfur dioxide in the flue gas is preferably 500 mg/Nm$^3$~10000 mg/Nm$^3$, and further preferably 1000 mg/Nm$^3$~5000 mg/Nm$^3$. The content of oxygen in the flue gas is preferably 3~8 vt %, and further preferably 6~8 vt %. The oxygenation equipment of the present invention can also be used to increase the content of oxygen in such glue gas, so as to improve the ratio of magnesium sulfate in the absorption seriflux.

The magnesium oxide based flue gas desulfurization of the present invention refers to a flue desulfurization process in which magnesium sulfate is the main constitute of the desulfurization agent, however, addition of any other constitute (e.g. calcium oxide, calcium lime, oxidizer, etc.) is not limited. In the magnesium oxide based desulfurization process, the structure and constitute of the desulfurization agent may vary, and its formulation and variation are well known to the person in the art.

Apparatus for Producing Magnesium Sulfate Through Flue Gas Desulfurization

The apparatus for producing magnesium sulfate through flue gas desulfurization of the present invention includes following equipment: an oxygenation equipment, a flue gas desulfurization equipment, a seriflux cycling equipment, an evaporation and concentration equipment, a cycling and precipitating equipment and an oxidation equipment. Preferably, the apparatus further includes a crystallization equipment, a centrifugation equipment and a drying equipment. Alternatively, the apparatus of the present invention further includes a packaging equipment. According to the apparatus of the present invention, the seriflux cycling equipment, the evaporation and concentration equipment and the cycling and precipitating equipment are all arranged in the interior of the flue gas desulfurization equipment.

The oxygenation equipment of the present invention is configured to increase the content of oxygen in flue gas before the flue gas enters the flue gas desulfurization equipment. The flue gas of the present invention is flue gas that has a low content of oxygen, and the ratio of magnesium sulfite in the absorption seriflux formed during the magnesium oxide based desulfurization is high, therefore the oxygenation equipment is needed to increase the content of oxygen in the flue gas, so as to improve the ratio of magnesium sulfate in the absorption seriflux. Preferably, the oxygenation equipment is arranged at a negative pressure location of the flue, and the opening size can be set according to the content of oxygen in the flue gas, so as to make the content of oxygen in the flue gas to be between 9~18 vt %, preferably 10~16 vt %, and further preferably 12~15 vt %.

According to an embodiment of the present invention, the oxygenation equipment is arranged in a negative pressure area of the flue gas section in the interior of the flue at the front end of the flue gas inlet of the flue gas desulfurization equipment where the temperature is 120~145° C., and preferably 125~140° C. A damper can be provided for the oxygenation equipment to automatically set the opening size of the damper to regulate the content of oxygen in the flue gas, which can also be realized through any other equipment that has a similar function and is well known to the person in the art. The oxygen can come from the air or a specially configured oxygen generating device such as an oxygen generator and so on. Considering the oxygenation effect, the oxygen generator is preferred.

An upper portion of the interior of the flue gas desulfurization equipment of the present invention is provided with a sulfur dioxide absorbing and spraying region, configured to remove sulfur dioxide in the flue gas through magnesium oxide based desulfurization, and form absorption seriflux. The flue gas desulfurization equipment of the present invention can be a flue gas devulcanizer or a flue gas desulfurization tower. In a point of view of industrial application, the flue gas desulfurization tower is preferred. The sulfur dioxide absorbing and spraying region includes at least one sulfur dioxide absorbing and spraying layer, preferably includes two or more sulfur dioxide absorbing and spraying layers, and further preferably includes two or three sulfur dioxide absorbing and spraying layers.

The evaporation and concentration equipment of the present invention is configured to cycle, evaporate and concentrate the seriflux (magnesium sulfate seriflux) cycled therein to form a concentration product. According to an embodiment of the present invention, the evaporation and concentration equipment is arranged in the interior of the flue gas desulfurization equipment, and is at the lower portion of the sulfur dioxide absorbing and spraying region. According to another embodiment of the present invention, the evaporation and concentration equipment is a spraying layer for evaporation and concentration; according to still another embodiment of the present invention, the spraying layer for evaporation and concentration and the sulfur dioxide absorbing and spraying region are separated by a liquid collector. The material of the liquid collector could be fiber reinforced plastics (Fiber Reinforced Plastics, FRP), the temperature tolerance range of which is preferably 50~95° C.; however, any equipment that can collect the seriflux could be selected, which is not limited to the above material.

In the present invention, the content of oxygen in the flue gas is regulated to between 9~18 vt % at the negative pressure location of the flue before the flue gas enters the flue gas desulfurization equipment, and then the flue gas enters the interior of the flue gas desulfurization equipment through the flue gas inlet of the equipment, goes through the evaporation and concentration equipment during ascending to be cooled and preliminarily absorbed, and then enters the sulfur dioxide absorbing and spraying region for desulfurization and absorption reaction, during which the sulfur dioxide in the flue gas is absorbed and the purified flue gas is discharged from the top of the flue gas desulfurization equipment. A demister can also be provided in the flue gas desulfurization equipment of the present invention, and the desulfurized flue gas can go through dehydration and demisting before being directly discharged.

The preparations used for the desulfurization of the present invention could be the frequently used desulfurization agent seriflux for the magnesium oxide based flue gas desulfurization in the art, e.g. the magnesium hydroxide seriflux formed by adding industrial tap water or high-temperature condensate water of an evaporation device into the magnesium oxide powder. Preferably, the desulfurization agent of the present invention can use the desulfurization agent disclosed in Chinese patent applications publication No. CN102745726A, CN102745725A and CN102836636A. For example, the desulfurization agents disclosed in embodiment 1 or 2 of CN102745726A. Herein, the contents of the above-mentioned patent applications are incorporated by reference in their entireties. The desulfurization agent seriflux can be obtained by evenly dispersing these desulfurization agents into water.

The cycling and precipitating equipment of the present invention is configured to receive the concentration product from the evaporation and concentration equipment, and precipitate the concentration product to form a precipitation product (including a preliminary crystallization procedure). Preferably, the cycling and precipitating equipment is arranged in the interior of the flue gas desulfurization equipment, and is at the lower portion of the evaporation and concentration equipment. The cycling and precipitating equipment can be a cycling and precipitating tank, which can be configured to be single-layer precipitation or double-layer precipitation or multi-layer precipitation. Its material can be glass fiber reinforced plastics, special steel or ordinary steel material with anti-corrosion treatment. According to an embodiment of the present invention, the cycling and precipitating tank is arranged at the underneath of the flue gas inlet, the middle-upper portion of the cycling and precipitating tank is provided with an overflowing opening, and the overflowing opening is connected with a filter through a discharging pump of the seriflux tank, such that the overflowing seriflux is recycled into the evaporation and concentration equipment after being filtered; the lower portion of the cycling and precipitating tank is provided with a discharge outlet of the cycling and precipitating tank.

The seriflux cycling equipment of the present invention is configured to receive the absorption seriflux formed in the flue gas desulfurization equipment, further oxidize the absorption seriflux into magnesium sulfate seriflux therein, and then cycle the magnesium sulfate seriflux (seriflux after oxidation) into the sulfur dioxide absorbing and spraying region and the evaporation and concentration equipment. Preferably, the magnesium sulfate seriflux is cycled into the sulfur dioxide absorbing and spraying region and/or the evaporation and concentration equipment after being filtered. Further preferably, the magnesium sulfate seriflux is cycled into the evaporation and concentration equipment after being filtered. Preferably, the seriflux cycling equipment includes a seriflux cycling tank arranged at the bottom of the interior of the flue gas desulfurization equipment, and the magnesium sulfate seriflux is respectively cycled into the sulfur dioxide absorbing and spraying region and the evaporation and concentration equipment by a cycling pump. Further preferably, the magnesium sulfate seriflux is transported from the seriflux cycling tank by a discharging pump to a filtration equipment to be filtered, and then enters the evaporation and concentration equipment through the cycling pump. The filtration equipment could be a plate filter or a vacuum belt filter, of which the plate filter is preferred; preferably, the filtration equipment contains filtration medium that is no less than 300 mesh, and preferably no less than 400 mesh. In an embodiment, the seriflux cycled to the evaporation and concentration equipment preferably accounts for 40~55 vt % of the output (the total cycle output of the seriflux cycling equipment), and further preferably for 45~50 vt %; the seriflux cycled from the seriflux cycling tank to the sulfur dioxide absorbing and spraying region can be respectively transported to the two or more sulfur dioxide absorbing and spraying layers by two or more cycling pumps, and the seriflux cycled to the sulfur dioxide absorbing and spraying region preferably accounts for 45~60 vt % of the output, and further preferably for 45~50 vt %.

The oxidation equipment of the present invention is configured to provide air for the seriflux cycling equipment, so that at least a part of magnesium sulfite in the absorption seriflux is further oxidized into magnesium sulfate. In the present invention, the air mainly plays a role of oxygen source, therefore the air can be any gas material that can provide oxygen, e.g. natural air, gas mixture composed of oxygen and nitrogen, or gas mixture with over 20 vt % oxygen, etc. According to an embodiment of the present invention, the oxidation equipment stops working when the content of magnesium sulfate in the magnesium sulfate seriflux formed after oxidation accounts for 70~90 wt % (preferably 80~85 wt %) of the total content of magnesium sulfite and magnesium sulfate, and then the magnesium sulfate seriflux (seriflux after oxidation) is respectively cycled to the sulfur dioxide absorbing and spraying region and the evaporation and concentration equipment by the cycling pumps. The oxidation equipment is preferably an oxidation fan, which could be a centrifugal fan, an axial-flow fan or a Roots blower, of which the centrifugal fan is preferred.

The crystallization equipment of the present invention is configured to receive and further crystallize the precipitation product (mixture of crystal and seriflux discharged after preliminary crystallization) from the cycling and precipitating equipment to form crystal slurry; the precipitation product entering the crystallization equipment is further formed into the crystal slurry by cooling in the crystallization equipment, and the magnesium sulfate crystal particle in the crystal slurry is larger than 0.15 mm, and preferably larger than 0.2 mm. In order to prevent the crystal particle from precipitating, a stirring device can be provided in the crystallization equipment, and the stirring device could adopt an air stirring device or an electric stirring device or the like. According to an embodiment of the present invention, the crystallization equipment of the present invention can be a crystallization tank, preferably, the crystallization tank has an automatic cooling system with a water cooling ring device. Its cold source can be normal temperature water or chilled water, or a cooing device such as an independently established cooling water tower. According to another embodiment of the present invention, the crystallization equipment of the present invention can be a multi-stage flash crystallization tank, or a continuous cooling crystallizer, or preferably a draft tube baffled (Draft Tube Baffled, DTB) continuous cooling crystallizer. The DTB crystallizer is composed of a crystallization tank, a condenser, a forced cycling pump, a discharging pump and a vacuum pump. The DTB crystallizer is a crystallizer combining the draft tube and the baffle plate, and is a circulating crystallizer for fine crystal slurry. With a draft tube and a tube-shaped baffle plate in the crystallizer and a propelled stirring system configured, a hot saturated feed liquid is continuously added to the lower portion of a cycle pipe, and transported to a heater after mixing with the mother liquid entrained with small crystals in the cycle pipe. The heated solution flows into the crystallizer from a position near the bottom of the draft tube, and is transported to the liquid surface along the draft tube by a slowly rotating propeller. The solution is evaporated and cooled at the liquid surface of the solution and reaches an over-saturated state, in which part of the solute is precipitated at the surface of suspended particles, so as to make the crystal grow. A precipitation region is also provided on the periphery of the annular baffle plate. Big particles are precipitated in the precipitation region, while small particles enter the cycle pipe with the mother liquid and are heated to dissolve. The crystals sink into an elutriation column from the bottom of the crystallizer. In order to make the granularity of the crystalline product as uniform as possible, part of the mother liquid from the precipitation region is added to the bottom of the elutriation column, so that small particles flow back to the crystallizer with the solution due to the effect of hydraulic classification, and the crystalline product is discharged from the lower portion of the elutriation column. The temperature for the cooling crystallization is generally controlled at 25~35° C., and preferably at 28~30° C.

The centrifugation equipment of the present invention is configured to receive and centrifugally separate the crystal slurry (crystalline product) discharged from the crystallization equipment to form a magnesium sulfate product. The centrifugation equipment can use those well known in the art.

The drying equipment of the present invention is configured to receive and dry the magnesium sulfate product (preliminary product of magnesium sulfate crystal) discharged from the centrifugation equipment to form a finished product. The drying equipment of the present invention is preferably a vibrated fluidized bed drying device, which is especially suitable for the drying process of the magnesium sulfate crystal. The present invention preferably adopts a vibrated fluidized bed drying device configured with a hot air device. A ventilator inputs filtered air into an air heater, the hot air after being heated enters the lower box body of the host, and then goes through the air distribution plate of the fluidized bed and is vertically blew from bottom to top into the dried supplies, so as to make the supplies to be in a boiling state. The supplies get in from a feed inlet, the host generates symmetrical vibration under an exciting force of a vibrating motor, such that the supplies are horizontally threw, so as to form a fluidization state due to the comprehensive effect of the hot air flow and the mechanical vibration, which therefore acquires long contact time of the supplies with the hot air and a large area, thereby obtaining highly efficient drying effect. The apparatus of the present invention can adopt saturated steam with a low calorific value at a temperature of 120~133° C. and a pressure of 0.2~0.3 MPa to heat and deliver the air into the vibrated fluidized bed, and to realize fully drying of the magnesium sulfate crystal into magnesium sulfate supplies. The steam output from the fluidized bed can be used for the evaporation and concentration equipment, which not only saves energy but also reduces the operation cost.

The packaging equipment of the present invention is configured to package the dried finished product. The packaging equipment can use those well known in the art.

The term "discharge" (e.g. discharge the mixture of crystal and seriflux from the cycling and precipitating equipment, discharge the crystal slurry from the crystallization equipment, discharge the magnesium sulfate crystal from the centrifugation equipment, etc.) described in the present invention can use a discharge equipment, and in an embodiment, the discharge equipment is a discharging pump.

The present invention can also provide an over-temperature emergency cooling device at the flue gas inlet position of the flue gas desulfurization equipment, to solve the over-temperature problems that may occur to the flue gas after the by-pass flue is removed. When the temperature exceeds a defined temperature, the seriflux of the upper portion of the seriflux cycling tank is transported by a cycling pump to an emergency region determined by the over-temperature emergency cooling device for emergency cooling of the flue gas desulfurization equipment. The defined temperature could be 160~200° C., and preferably no less than 180° C.

Method for Producing Magnesium Sulfate Through Flue Gas Desulfurization

The above-mentioned apparatus of the present invention can be used to produce magnesium sulfate, including the following steps: an oxygenation step, a flue gas desulfurization step, a seriflux cycling step, an evaporation and concentration step, a cycling and precipitating step and an oxidation step. Preferably, the present method further includes a crystallization step, a centrifugation step and a drying step and, alternatively, further includes a packaging step.

The oxygenation step of the present invention includes: increasing the content of oxygen in the flue gas by the oxygenation equipment before the flue gas enters the flue gas desulfurization equipment. The flue gas of the present invention is flue gas from the coal fired boiler, or any other flue gas in which the content of sulfur dioxide is between 300 mg/Nm$^3$~20000 mg/Nm$^3$ and the content of oxygen is between 0~8 vt %. The content of oxygen in these flue gases is low, thus the present invention provides the oxygenation step before the flue enters the fuel gas desulfurization equipment to increase the content of oxygen in the flue gas, so as to improve the magnesium sulfate ratio in the absorption seriflux. Preferably, the oxygenation step makes the content of oxygen in the flue gas to be 9~18 vt %, and further preferably to be 12~15 vt %. According to an embodiment of the present invention, the oxygenation step regulates the content of oxygen in the flue gas by an oxygenation equipment provided at a negative positive position of the flue, and preferably at a negative pressure area of the flue gas section with a temperature of 125~140° C. in the flue. The oxygenation equipment used in the oxygenation step is described as above.

The fuel gas desulfurization step includes: removing sulfur dioxide from the flue gas in a magnesium oxide based manner in the flue gas desulfurization equipment and forming absorption seriflux. According to an embodiment of the present invention, the upper portion of the interior of the flue gas desulfurization equipment is provided with a sulfur dioxide absorbing and spraying region. The oxygenated flue gas enters the interior of the flue gas desulfurization equipment from the flue gas inlet of the equipment, and goes through the sulfur dioxide absorbing and spraying region during ascending, during which the sulfur dioxide in the flue gas is absorbed and the purified flue gas is discharged from the top of the flue gas desulfurization equipment. The preparations used for the desulfurization of the present invention are described as above. The flow rate of the flue gas at the flue gas inlet of the flue gas desulfurization equipment is 2.5~4.5 m/s, and preferably is 3~4 m/s; the temperature of the flue gas at the inlet is 110~180° C., and preferably is 120~160° C.

The seriflux cycling step of the present invention includes: further oxidizing the seriflux received in the seriflux cycling equipment to form magnesium sulfate seriflux, and then cycling the magnesium sulfate seriflux to the sulfur dioxide absorbing and spraying region and the evaporation and concentration equipment in the flue gas desulfurization equipment. The cycling can be performed by a cycling pump. Preferably, the magnesium sulfate seriflux formed after oxidation is filtered and then cycled into the sulfur dioxide absorbing and spraying region and the evaporation and concentration equipment. Further preferably, the seriflux cycling equipment includes a seriflux cycling tank provided at the bottom of the interior of the flue gas desulfurization equipment, and the seriflux is respectively cycled into the sulfur dioxide absorbing and spraying region and the evaporation and concentration equipment by cycling pumps. Furthermore preferably, the magnesium sulfate seriflux formed after oxidation is transported from the seriflux cycling tank to a filtration equipment by a discharging pump, and then enters the evaporation and concentration equipment through the cycling pump after being filtered. The filtration equipment is described as above. The seriflux cycled to the evaporation and concentration equipment preferably accounts for 40~55 vt % of the output (the total cycle output of the seriflux cycling equipment), and further preferably for 45~50 vt %; the seriflux cycled to the sulfur dioxide absorbing and spraying region can be respectively transported to the sulfur dioxide absorbing and spraying layers by two or more cycling pumps, and the seriflux cycled to the sulfur dioxide absorbing and spraying region preferably accounts for 45~60 vt % of the output, and further preferably for 45~50 vt %. The pH in the seriflux cycling equipment is controlled to be between 6~7.

The concentration step of the present invention includes: cycling, evaporating and concentrating the seriflux (magnesium sulfate seriflux) cycled therein to form a concentration product. According to an embodiment of the present invention, the evaporation and concentration equipment is arranged in the interior of the flue gas desulfurization equipment, and is at the lower portion of the sulfur dioxide absorbing and spraying region. The oxygenated flue gas of the present invention, during ascending, firstly goes through the evaporation and concentration equipment to be cooled and preliminarily absorbed, and then goes through the sulfur dioxide absorbing and spraying region for desulfurization and absorption reaction. The desulfurized flue gas can further go through dehydration and demisting before being directly discharged.

The cycling and precipitating step of the present invention includes: receiving, in a cycling and precipitating equipment, the concentration product from the evaporation and concentration equipment, and precipitating the concentration product to form a precipitation product (a mixture of crystal and seriflux discharged after preliminary crystallization). The magnesium sulfate crystal particle in the precipitation product is larger than 0.1 mm; preferably, the solid content of the precipitation product (mixture of crystal and seriflux) discharged from the cycling and precipitating step is over 30 wt %. The temperature of the cycling and precipitating equipment is generally controlled at 55~70° C., and preferably at 60~65° C. Preferably, the crystal particle discharged from the cycling and precipitating step is larger than 0.1 mm, and the precipitation product (mixture of crystal and seriflux) with a solid content of over 30 wt % is transported to the crystallization equipment for further crystallization through the discharge outlet located at the bottom. The seriflux overflowing from the cycling and precipitating equipment can be cycled into the evaporation and concentration equipment to be evaporated and concentrated, and preferably the seriflux firstly goes through the filtration equipment to be filtered, and then goes through the spraying layer for evaporation and concentration to be recycled; the filtration equipment is described as above.

The oxidation step of the present invention includes: providing air for the seriflux cycling equipment by the oxidation equipment, so as to further oxidize at least part of magnesium sulfite in the absorption seriflux into magnesium sulfate. According to an embodiment of the present invention, the oxidation step makes the content of the magnesium sulfate in the magnesium sulfate seriflux formed after oxidation account for 70~90 wt % of the total content of magnesium sulfite and magnesium sulfate, the magnesium sulfate seriflux formed after oxidation is respectively cycled to the sulfur dioxide absorbing and spraying region and the evaporation and concentration equipment by the cycling pumps. The oxidation equipment is described as above.

The crystallization step of the present invention is used to further crystallize in the crystallization equipment the precipitation product (mixture of crystal and seriflux) discharged from the cycling and precipitating step to obtain crystal slurry; the precipitation product into the crystallization equipment is cooled to be an over-saturated state of the magnesium sulfate for cooling crystallization in the crystallization equipment, and crystal slurry is further formed, during which the crystallization temperature is generally controlled at 20~30° C., and preferable at 20~25° C.; the crystal particle formed in the crystallization step is larger than 0.15 mm, and preferably larger than 0.2 mm; the granularity of the present invention is measured by a sieving manner (see GB/T21524-2008); in order to prevent the crystal particle from precipitating, a stirring device is provided in the crystallization equipment; the magnesium sulfate crystal gradually grows, gets rid of the disturbance of the stirring equipment and precipitates at the bottom of the crystallization equipment; and then the crystal slurry is discharged by the discharging pump to the centrifugation equipment. The solid content of the discharged crystal slurry is over 40 wt %.

The centrifugation step of the present invention is used to centrifugally separate in the centrifugation equipment the crystal slurry discharged from the crystallization step to form a mother liquid and a magnesium sulfate product (preliminary product of magnesium sulfate crystal); in order to guarantee sufficient centrifugation, the centrifugation speed is controlled at 1500~2000 rpm, and preferably at 1600~1800 rpm. For the batch operation, the centrifugation time for each batch of supplies is controlled at 5~30 minutes, and preferably at 5~10 minutes. For the continuous operation, the centrifugation time for each batch of supplies is controlled at 10~30 minutes, and preferably at 10~15 minutes. The water content of the magnesium sulfate product (preliminary product of magnesium sulfate crystal) obtained from the centrifugation step is less than 2 wt %. The mother liquid separated from the centrifugation step can be cycled into the evaporation and concentration equipment, e.g. the mother liquid can be cycled into the evaporation and concentration equipment by the cycling pump.

The drying step of the present invention is used to dry the magnesium sulfate product into a finished product in the drying equipment. The drying step of the present invention can be operated in a manner of vacuum drying or introducing heated air. The drying temperature is 90~150° C., preferably 100~130° C., and further preferably 110~120° C.; the drying pressure is 0.01~0.5 MPa, and preferably 0.05~0.2 MPa. Through the drying step, the water content of the dried precipitate is less than 1 wt %, preferably less than 0.5 wt %, and further preferably less than 0.1 wt %. In an embodiment, the air is heated by saturated steam at a temperature of 120° C. and a pressure of 0.2 MPa and then introduced to the vibrated fluidized bed, to fully dry the magnesium sulfate crystal into a finished magnesium sulfate product under the mechanical vibration.

The magnesium sulfate described in the present invention is not limited to magnesium sulfate heptahydrate, and also includes magnesium sulfate monohydrate, magnesium sulfate dihydrate, magnesium sulfate trihydrate, magnesium sulfate pentahydrate, magnesium sulfate hexahydrate, magnesium sulfate and magnesium sulfate dodecahydrate. For the person skilled in the art, the crystalline after evaporation and concentration can be respectively crystallized into crystals with 1~7, 12 crystal-waters by controlling the temperature, or by generally extending the drying time or adjusting the size and scale of the process equipment in the drying period so as to make the residence time of the supplies in the dryer to be longer or shorter to obtain different types of magnesium sulfate product. For example, magnesium sulfate dodecahydrate can be precipitated out in a saturated solution at −3.9~1.8° C., magnesium sulfate heptahydrate can be precipitated out in a saturated solution at 1.8~48.1° C. and magnesium sulfate hexahydrate can be precipitated out in a saturated solution at 48.1~67.5° C. Magnesium sulfate hexahydrate heterogeneously melts at between 87~92° C. to form magnesium sulfate pentahydrate or magnesium sulfate tetrahydrate, and then transforms into magnesium sulfate trihydrate at 106° C.; the magnesium sulfate trihydrate transforms into magnesium sulfate dihydrate at 122 to 124° C., the magnesium sulfate dihydrate transforms into stable magnesium sulfate monohydrate at 161~169° C. or magnesium sulfate at over 167.5° C.

The present invention can also be applicable for traditional calcium based, magnesium based or ammonium based modifications, as long as the internal structure of the tower and the process in the traditional calcium based or ammonium based manner is modified according to the structure and process provided by the present invention; and all the modifications for the original calcium based, magnesium based or ammonium based manner that are in accordance with the method of the present invention shall fall into the protection scope of the present invention.

The present invention is described in further detail by combining the accompanying drawings.

Embodiment 1

The FIGURE is a diagram of an apparatus of Embodiment 1, and the apparatus includes a desulfurization tower 1. The middle-lower portion of the desulfurization tower 1 is provided with a flue gas inlet 23, and the top portion is provided with a flue gas outlet 10. The front end of the flue gas inlet 23 is provided with an oxygenation device 26. An over-temperature emergency cooling device 24 is provided above the flue gas inlet 23, so as to solve the over-temperature problems that may occur to the flue gas after the by-pass flue is removed. When the temperature exceeds the defined temperature of 180° C., the seriflux at the upper portion of the seriflux cycling tank 11 is transported by the cycling pump 15 of the over-temperature emergency cooling device to the emergency region determined by the over-temperature emergency cooling device 24 for emergency cooling of the desulfurization tower 1. A spraying layer 3 for evaporation and concentration is provided above the over-temperature emergency cooling device 24, and a liquid collector 4 is provided above the spraying layer 3 for evaporation and concentration; a two-stage sulfur dioxide absorbing and spraying layer 7 and a three-stage sulfur dioxide absorbing and spraying layer 8 are provided above the liquid collector 4; a demister 9 is provided above the three-stage sulfur dioxide absorbing and spraying layer 8; a cycling and precipitating tank 2 is provided at the underneath of the flue gas inlet 23, the middle-upper portion of the cycling and precipitating tank 2 is provided with an overflowing opening 5, and the overflowing opening 5 is connected with a filter 22 through a discharging pump 21 of the seriflux tank; the lower portion of the cycling and precipitating tank 2 is provided with a discharge outlet 6 of the cycling and precipitating tank; the seriflux cycling tank 11 is arranged at the bottom of the desulfurization tower 1, and its outlet pipeline is divided into four lines, one line starts from the lower portion of the seriflux cycling tank 11 and is connected to the filter 22 through the discharging pump 21 of the seriflux tank, and the filter 22 is connected to the spraying layer 3 for evaporation and concentration through a cycling pump 12 for evaporation and concentration, so that the clear liquid obtained from the filter 22 is transported by the cycling pump 12 for evaporation and concentration to the spraying layer 3 for evaporation and concentration to be concentrated and crystallized; another two lines start from the upper portion of the seriflux cycling tank 11 and are respectively connected to the two-stage sulfur dioxide absorbing and spraying layer 7 and the three-stage sulfur dioxide absorbing and spraying layer 8 through a cycling pump 13 for the two-stage sulfur dioxide absorbing and spraying layer and a cycling pump 14 for the three-stage sulfur dioxide absorbing and spraying layer; the fourth line starts from the upper portion of the seriflux cycling tank 11 and is connected with the emergency region determined by the over-temperature emergency cooling device 24 through a cycling pump 15 for the over-temperature emergency cooling device; the seriflux cycling tank 11 is connected with an oxidation fan 25, the oxidation fan 25 blasts air into the seriflux cycling tank 11 to oxidize at least part of the magnesium sulfite in the seriflux into magnesium sulfate. The discharge outlet 6 of the cycling and precipitating tank, a crystallization tank 16, a centrifuge 17, a dryer 18 and a packaging machine 19 are sequentially connected; and the centrifuge 17 is also connected with the cycling pump 12 for evaporation and concentration through a cycling pump 20 for the mother liquid back to the spraying layer for evaporation and concentration, so as to transport the mother liquid produced by the centrifugation to the spraying layer 3 for evaporation and concentration for cycling and crystallization.

The process flow of Embodiment 1 is as follows:

a. Before the flue gas enters the desulfurization tower 1, the content of oxygen in the flue gas is controlled by the oxygenation device 26 arranged at the negative pressure location of the flue at the front end of the flue gas inlet 23;

b. The oxygenated flue gas enters the desulfurization tower 1 from the flue gas inlet 23 of the desulfurization tower 1, goes through the over-temperature emergency cooling device 24, then enters the spraying layer 3 for evaporation and concentration to be cooled and preliminarily absorbed, then sequentially enters the two-stage sulfur dioxide absorbing and spraying layer 7 and the three-stage sulfur dioxide absorbing and spraying layer 8 for desulfurization and absorption reaction, and finally enters the demister 9 for dehydration and demisting before being directly discharged from the flue gas outlet 10 of the top chimney;

c. The absorption seriflux formed from the two-stage sulfur dioxide absorbing and spraying layer 7 and the three-stage sulfur dioxide absorbing and spraying layer 8 by absorbing sulfur dioxide enters the seriflux cycling tank 11;

d. The oxidation fan 25 blasts air to make the seriflux in the seriflux cycling tank 11 to be further oxidized, during which part of magnesium sulfite is further oxidized into magnesium sulfate, and the oxidation fan 25 stops working when the content of the magnesium sulfate reaches 90 wt % of the total content of magnesium sulfite and magnesium sulfate;

e. After the oxidation fan 25 stops working, the magnesium sulfate seriflux formed after oxidation is discharged from the lower portion of the seriflux cycling tank 11 through the discharging pump 21 of the seriflux tank, and then is transported to the spraying layer 3 for evaporation and concentration for evaporation and concentration after being filtered by the filter 22, during which the cycling quantity accounts for 50 vt % of the total output of the seriflux of the seriflux cycling tank; the seriflux at the upper portion of the seriflux cycling tank 11 is respectively transported to the two-stage sulfur dioxide absorbing and spraying layer 7 and the three-stage sulfur dioxide absorbing and spraying layer 8 through the cycling pump 13 for the two-stage sulfur dioxide absorbing and spraying layer and the cycling pump 14 for the three-stage sulfur dioxide absorbing and spraying layer, during which the cycling quantity of the two accounts for 50% of the total output, and the volume ratio of the two is 1:1;

f. The seriflux overflowing from the overflowing opening 5 of the cycling and precipitating tank 2 enters the filter 22 through the discharging pump 21 of the seriflux tank, and then is transported to the spraying layer 3 for evaporation and concentration for recycling and crystallization after being filtered;

g. A precipitation product (a mixture of magnesium sulfate crystals and the seriflux) which has over 0.1 mm crystal particle and over 30 wt % solid content is discharged from the discharge outlet 6 of the cycling and precipitating tank at the bottom of the cycling and precipitating tank 2, and then enters the crystallization tank 16 for cooling, so as to form magnesium sulfate crystals larger than 0.15 mm; in order to prevent the crystal from precipitating, a stirring device is provided in the crystallization tank, and the stirring device is an electrical stirring device;

h. After the precipitation product from the cycling and precipitating tank 2 to the crystallization tank 16 is further crystallized in the crystallization tank 16, the obtained crystal slurry with an over 40 wt % solid content is transported to the centrifuge 17 for separation, the mother liquid separated from the centrifuge 17 is transported to the spraying layer 3 for evaporation and concentration to be evaporated and concentrated, the obtained magnesium sulfate product with a water content of less than 2 wt % is transported to the dryer 18 to be further dried into a finished product, and then the finished product is packaged by the packaging machine 19.

In the process flow of the present embodiment:

1) A magnesium hydroxide solution is formulated by adding the tap water into the magnesium oxide powder, and the magnesium hydroxide solution is pumped to the desulfurization tower 1 as the desulfurization agent;

2) The flue gas (the content of oxygen is 8 vt %) generated by the coal fired boiler enters the desulfurization tower 1 from the flue gas inlet 23 of the desulfurization tower 1, and is discharged from the flue gas outlet 10. The oxygenation device 26 is used to control the content of oxygen in the flue gas before desulfurization in Table 1 to be 18 vt %;

3) The pH of the seriflux cycling tank 11 at the bottom of the desulfurization tower 1 is controlled at between 6~7.

4) The filter 22 contains a filtration medium of 300 mesh, so as to realize fine filtration of the magnesium sulfate seriflux (the magnesium sulfate seriflux formed after oxidation in the seriflux cycling tank 11 and the seriflux overflowing from the overflowing opening 5).

5) The temperature of the cycling and precipitating tank 2 is controlled at 60° C., and the precipitation product with over 30 wt % solid content enters the crystallization tank 16 through the discharge outlet 6 of the cycling and precipitating tank 2 for further cooling crystallization;

6) The magnesium sulfate solution in the crystallization tank 16 is cooled by cycling cooling water with the temperature stabled at 20~30° C., so as to achieve an oversaturated state of the magnesium sulfate for cooling crystallization;

7) The air is heated by saturated steam at a temperature of 120° C. and a pressure of 0.2 MPa and then introduced to the dryer 18 (the vibrated fluidized bed) to fully dry the magnesium sulfate crystal into a finished magnesium sulfate product under the mechanical vibration; and the finished magnesium sulfate product is packaged by an automatic packaging machine. The quality of the finally obtained magnesium sulfate product is superior to that of the qualified industrial products;

8) Other parameters of the above-mentioned process are shown in Table 1, and the flue gas discharging condition and the condition of the obtained magnesium sulfate are seen in table 2 and table 3.

TABLE 1

Parameters of the operating condition of a 200 t/h coal fired boiler flue gas desulfurization project

| No. | Project | Number | Unit |
|---|---|---|---|
| 1 | Inlet flue gas volume of the desulfurization tower (operating condition) | 380000 | m³/h |
| 2 | Flue gas volume in a standard state | 277863 | Nm³/h |
| 3 | Inlet flue gas temperature of the desulfurization tower | 120 | ° C. |
| 4 | Inlet concentration of sulfur dioxide | 3000 | mg/Nm³ |
| 5 | Ratio of magnesium to sulfur | 1.02 | Mg/S |
| 6 | Purity of magnesium oxide | 85 | % mass percentage |
| 7 | Moisture content of the flue gas | 5.2 | % mass percentage |

TABLE 2

Discharge and magnesium sulfate output condition of the desulfurization project

| No. | Project | Number | Unit |
|---|---|---|---|
| 1 | Outlet flue gas volume of the desulfurization tower (operating condition) | 346085 | m³/h |
| 2 | Flue gas discharge temperature | 51 | ° C. |
| 3 | Discharge concentration of sulfur dioxide | <100 | mg/Nm³ |
| 4 | Output of magnesium sulfate | 1.4 | t/h |
| 5 | Quality of magnesium sulfate | >98 | % mass percentage |

TABLE 3

Quality of magnesium sulfate produced in the desulfurization project

| No. | Project | Number | Unit |
|---|---|---|---|
| 1 | Main content (calculated in $MgSO_4 \cdot 7H_2O$) | 99 | % mass percentage |
| 2 | Iron (calculated in Fe) content | 0.0045 | % mass percentage |
| 3 | Chloride (calculated in Cl) content | 0.10 | % mass percentage |
| 4 | Heavy metal content | 0.0005 | % mass percentage |
| 5 | Water-insoluble material content | 0.08 | % mass percentage |

The measuring manner of the quality of the magnesium sulfate adopts <Chemical Industry Standard of HG/T 2680-2009 of People's Republic of China>

The present invention is not limited to the above-mentioned embodiments, any variation, modification or replacement that can be conceived by the person skilled in the art without departing from the substantial content of the present invention shall fall into the scope of the present invention.

What is claimed is:

1. An apparatus for producing magnesium sulfate through flue gas desulfurization, comprising:
    an oxygenation equipment, configured to increase a content of oxygen in flue gas before the flue gas enters a flue gas desulfurization equipment;
    a flue gas desulfurization equipment, an interior of which is provided with a sulfur dioxide absorbing and spraying region, configured to remove sulfur dioxide in the flue gas through magnesium oxide based desulfurization, and form absorption seriflux;
    a seriflux cycling equipment, configured to receive the absorption seriflux from the flue gas desulfurization equipment, further oxidize the absorption seriflux into magnesium sulfate seriflux therein, and then cycle the magnesium sulfate seriflux into the sulfur dioxide absorbing and spraying region and an evaporation and concentration equipment;
    an oxidation equipment, configured to provide air for the seriflux cycling equipment, so that at least a part of magnesium sulfite in the absorption seriflux is further oxidized into magnesium sulfate;
    an evaporation and concentration equipment, configured to evaporate and concentrate the seriflux cycled therein to form a concentration product;
    a cycling and precipitating equipment, configured to receive the concentration product from the evaporation and concentration equipment, and precipitate the concentration product, so as to form a precipitation product; and
    wherein, the seriflux cycling equipment, the evaporation and concentration equipment and the cycling and precipitating equipment are all arranged in the interior of the flue gas desulfurization equipment.

2. The apparatus for producing magnesium sulfate through flue gas desulfurization according to claim 1, wherein, the sulfur dioxide absorbing and spraying region comprises two or more sulfur dioxide absorbing and spraying layers; the evaporation and concentration equipment is located at a lower portion of the sulfur dioxide absorbing and spraying region.

3. The apparatus for producing magnesium sulfate through flue gas desulfurization according to claim 1, wherein, the apparatus further comprises a liquid collector, configured to separate the evaporation and concentration equipment and the sulfur dioxide absorbing and spraying region; the oxygenation equipment is arranged at a negative pressure location of a flue.

4. The apparatus for producing magnesium sulfate through flue gas desulfurization according to claim 1, wherein, the apparatus further comprises:
    a crystallization equipment, configured to crystallize the precipitation product from the cycling and precipitating equipment, so as to form a crystallization product;
    a centrifugation equipment, configured to centrifugally separate the crystallization product from the crystallization equipment, so as to form a mother liquid and a magnesium sulfate product; and
    a drying equipment, configured to dry the magnesium sulfate product from the centrifugation equipment.

5. The apparatus for producing magnesium sulfate through flue gas desulfurization according to claim 1, wherein, the flue gas satisfies one of following conditions:
    1) the flue gas is flue gas that comes from a coal fired boiler;
    2) a content of sulfur dioxide in the flue gas is 300 $mg/Nm^3 \sim 20000$ $mg/Nm^3$, and a content of oxygen is 0~8 vt %.

6. A method for producing magnesium sulfate through the apparatus according to claim 1, comprising steps of:
    an oxygenation step: increasing an content of oxygen in flue gas to 9~18 vt % before the flue gas enters a flue gas desulfurization equipment;
    a flue gas desulfurization step: removing sulfur dioxide in the flue gas through magnesium oxide based desulfurization in the flue gas desulfurization equipment, and forming absorption seriflux;
    a seriflux cycling step: receiving, by a seriflux cycling equipment, the absorption seriflux from the flue gas desulfurization equipment, further oxidizing the absorption seriflux into magnesium sulfate seriflux therein, and then cycling the magnesium sulfate seriflux into a sulfur dioxide absorbing and spraying region and an evaporation and concentration equipment;
    an oxidation step: providing air for the seriflux cycling equipment, so that at least a part of magnesium sulfite in the absorption seriflux is further oxidized into magnesium sulfate;
    an evaporation and concentration step: evaporating and concentrating the seriflux cycled therein in the evaporation and concentration equipment, so as to form a concentration product; and
    a cycling and precipitating step: receiving, by a cycling and precipitating equipment, the concentration product from the evaporation and concentration equipment, and precipitating the concentration product, so as to form a precipitation product.

7. The method according to claim 6, wherein, the method further comprises:
    a crystallization step: crystallizing the precipitation product from the cycling and precipitating equipment, so as to form a crystallization product;
    a centrifugation step: centrifugally separating the crystallization product from the crystallization equipment in a centrifugation equipment, so as to form a mother liquid and a magnesium sulfate product; and
    a drying step: drying the magnesium sulfate product from the centrifugation equipment in a drying equipment.

8. The method according to claim 6, wherein, in the oxidation step, a content of magnesium sulfate in the magnesium sulfate seriflux obtained by oxidation is 70~90 wt % of a total content of magnesium sulfite and magnesium sulfate.

9. The method according to claim 6, wherein,
   a seriflux overflowing from the cycling and precipitating equipment in the cycling and precipitating step is filtered and then cycled to the evaporation and concentration equipment; and/or
   the mother liquid separated in the centrifugation step is cycled into the evaporation and concentration equipment.

10. The method according to claim 6, wherein, a magnesium sulfate crystal particle in the precipitation product is larger than 0.1 mm; a magnesium sulfate crystal particle in the crystallization product is larger than 0.15 mm.

* * * * *